Patented Jan. 23, 1934

1,944,788

UNITED STATES PATENT OFFICE 1,944,788

FERTILIZER

Frederick William Genz, Richmond, Va., assignor to Virginia-Carolina Chemical Corp., Richmond, Va., a corporation of Virginia No Drawing. Application November 30, 1931
Serial No. 578,193

4 Claims. (Cl. 71—6)

This invention relates to fertilizers and includes within its purview both the product and the process for making the same.

The general object of the invention is to provide a fertilizer of homogeneous constituency comprising a spongy humus promoting base serving as a matrix for the plant nutrient salts, which through the steps of the novel manufacturing process are uniformly dispersed throughout the texture of the spongy mass, for the most part in the form of microscopic crystals, and in such concentration as to obtain the desired signature value of the fertilizer, the native structure of the base material being more or less modified, through the reaction involved in the deposition of the salts, a portion of the spongy material being reduced to colloidal state, in which it acquires optimum physical as well as chemical properties with respect to plant growth.

Among the advantages of fertilizer constituted as above, one may mention a high degree of capillarity, whereby it retains the moisture in the soil and inhibits leaching, thus extending the utility of the water soluble components over a longer period of time.

Another and special advantage is that due to the thorough dispersal of the plant food through the substance of the matrix, each particle contains the pro-rata of plant food, and no individual particle contains highly concentrated percentages of plant food, therefore no particle of the salts of such concentration or size as to "burn" the plant, comes into contact with the roots as is the case with usual fertilizers which are simply mechanical mixtures of highly concentrated individual particles.

Still another advantage of the fertilizer of the present invention lies in its capacity for improved distribution, both by drilling and broadcasting. In conventional dry mixed fertilizers, even including those in which organic or other spongy ingredients may be mixed with the nutrient salts, there is always the tendency for the lighter materials to work to the top in the bag, in handling and transportation, and also to the top of the hopper of the drill.

The uniform low density of the homogeneous impregnated mass of the fertilizer of the present invention ensures uniform distribution whether by drilling or broadcasting.

A further advantage of the new fertilizer is that it will not set up either in the bags or drill, the hygroscopicity being such that it remains loose and free even under the most trying atmospheric conditions.

Still another advantage of the improved fertilizer is the latitude which it affords for the practical incorporation of any desired fertilizer ingredient, and its capacity for adsorbing or absorbing so large a quantity of acid or basic ingredient as to make possible, when the alkalined or acidulated cellular substance is treated with a salts-forming ingredient, the development or deposition in situ in the matrix material, of plant nutrient salts in relatively large proportion, whereby high analysis values of usual fertilizers can be duplicated without impairing the homogeneity of the composition.

Another advantage of the product of the present invention is that it can be used in mixtures with any fertilizer or fertilizing ingredient in any desired proportion.

Other advantages and objects of the invention will appear as the following description proceeds.

Any organic substance or cellular structure may be looked to as an eligible source of the spongy matrix substance, that is to say, those which have a higher nitrogen activity than humus, in other words, such substances as are brought toward the state of humus by disintegration and not such substances as peat for example, which are already past the state of humus in the order of decreasing nitrogen activity and which have undergone to some extent at least, mineralogic metamorphosis. The invention from the economical standpoint contemplates the utilization of a by-product of industry and suggests tobacco stems, peanut shell meal, apple pomace, cotton seed hulls, cocoa bean hulls, cotton seed meal, tankage, blood, soya bean meal, bagasse, corn cobs, corn stalks, and/or dried fish as available substances of this class.

It is not necessary that the spongy base be of one material alone, for the invention contemplates as well the use of one or more of the cellular substances in mixture, and in this connection the use of diatomaceous earth such as bentonite, kaolin, kieselguhr, etc., in mixture with organic cellular matrix material, is within the concept of the invention.

In the present exemplary embodiment of the invention, tobacco stems have been selected as the cellular base material constituting the body or mass of the fertilizer and in and throughout which the crystalline salt components are implanted.

The process of manufacture contemplates development of the plant nutrient salts in situ in the cellular interstices of the matrix and to this end it proposes the impregnation of the matrix substance with either an alkali or an acid and the subsequent impregnation of the treated material, respectively, with an acid or an alkali, the reaction taking place within the texture of the matrix substance, and in addition to forming and depositing the crystalline salts, disintegrating a part of the matrix substance reducing it to colloidal state.

The cellular matrix in its initial form has the organized structure of life or growth, and is remote from the state of humus in the direction of high nitrogen activity. The disintegration of a part of the matrix substance is the result both of mechanical and chemical reaction which takes place in the formation of the plant nutrient salts. The reduction of at least a part of the matrix substance to colloidal form so finely comminutes it as to produce an almost infinite multiplicity of microscopic voids or interstices both in and out of the colloidal particles which increase the capacity of the matrix substance to such an extent that it will hold enough of the plant nutrient salts to satisfy the requirements of the richest analysis of fertilizer while at the same time the matrix substance will predominate in quantity in the mass of the fertilizer. Since it has been quite impossible commercially to so commingle the plant nutrient salts in the fertilizer mixture with such uniformity as to determine a satisfactory degree of homogeneity in the solution in the soil, and likewise impossible to control the rate of diffusion, there has been usually the risk of burning the plant rootlets. By the present invention however the minuteness of the crystals forming in the inter-colloidal particle spaces, and the dissemination of these minute crystals in the colloidal mass ensures not only the homogenizing of the solution in the soil, but also a retarded dispersion. This condition results from the reaction which attends the forming of the salts in situ in a matrix material on the high side as regards nitrogen activity, of humus. The fertilizer so compounded is thus entirely inert insofar as any toxic or burning qualities are concerned and may be safely used in any proportion in contact with the plant rootlets.

The alkali and acid are of course, chosen with regard to the nutritive characteristics of the eventuating salts and lime and magnesia are regarded as the most appropriate alkalinizing substances because with phosphoric acids or certain phosphatic salts, part of the phosphoric acid is combined with the lime or magnesia to form water-insoluble phosphates, which are almost entirely available for plant life.

Referring to the tobacco stems, these are first treated with milk of lime or magnesia or any other suitable or desirable alkaline solution until they have become thoroughly soaked with the alkali. Then they are dried, at least in part to restore the absorptive capacity of the stems. They are next treated with an acid chosen with reference to the nature of the salt or salts which it is desired to fix in the matrix.

Nitric, hydrochloric, phosphoric, sulphuric and other acids may be employed, but the first two are in general impractical on account of their corrosive action on the linings of the containing vessels and in the case of nitric acid because of the evolved fumes. The other acids are preferably used in weak solutions to promote the wetting of the tobacco stems. When the reaction has taken place, the resulting product is dried if necessary, although in some instances the product may be considered finished without having been completely dried.

The processed tobacco stems resulting as a by-product of the nicotine manufacturing industry, come already permeated with lime and whilesoever the supply of stems from this source may remain adequate they afford an ideal source of the matrix component of the new fertilizer, since one step of the process, the alkali treatment has already been performed.

The absorptive and adsorptive capacity of the limed stems for the acid is illustrated by the following data, obtained experimentally and calculated for a net ton base:

1630 lbs. of limed tobacco stems
1865 lbs. crude phosphoric acid—(23% phosphorus pentoxide)

3495 lbs. gross
1495 lbs. total shrinkage (mixing and drying)

2000 lbs. net.

The amount of available phosphoric acid which the quantity of stems in a ton of fertilizer is capable of taking up, is predicated upon its alkali content up to the limits of the formation of mono-basic salts plus reasonable amounts of free acid and is amply sufficient to provide for a phosphatic content of a value high enough to duplicate the analysis formulæ of fertilizers having the usual high phosphatic ratios.

If stems or any other cellular matrix are chosen which have not been rendered alkaline in the process of which they are a by-product, the alkali may be applied in determined amounts so as to ensure the neutral reaction of the finished fertilizer. If the process is reversed, that is to say, if the stems are first acidulated and the alkali then added, a close control of the reaction is afforded, since the stems may be impregnated with a determined proportion of acid necessary to produce with the added alkali, the proportion of nutrient salts desired. Excess acidulation up to a certain degree is unobjectionable, since when the fertilizer with acid reaction is applied to the soil, the soil colloids rectify this acid condition.

The process of the present invention which comprises successively alkalinizing and/or acidulating (or vice versa), a body of cellular and/or spongy substance, the acid and alkali being selected to produce in the spongy substance a plant nutrient salt, lends itself readily to the manufacture of fertilizers having a wide range of chemical analyses. For instance, in making a fertilizer, the analysis of which includes monoammonium phosphate and diammonium phosphate as well as the monocalcium phosphate, dicalcium phosphate or other phosphatic complexes, ammonia may be added in the anhydrous or aqua form to the mixture of limed stems after the latter have been wetted with the phosphoric acid. The ammonia may also serve as a convenient vehicle for introducing certain chemicals which ordinarily require to be added in weak aqueous solution. Nitrate of soda and muriate of potash, for example, cannot be added directly to the phosphoric acid on account of the liberation of the nitric and hydrochloric acids respectively, which have corrosive effect upon the lead linings of the mixing vessels. These substances can be added to the acid wetted stems, in weak solution, but by dissolving them in the ammonia solution excessive dilution of the mixture is avoided.

Any of the substances commonly regarded as plant nutrients may be incorporated in homogeneous combination with the cellular matrix, the nature of these substances governing the technique of procedure.

In that variant of the process which involves the forming of the nutrient salt or salts solution outside of the cellular matrix and then impregnating the matrix material with the salts solution and crystallizing the salts in the matrix material by drying, the process may be so controlled that the salts solution has either an acid, alkaline or neutral reaction. The acid and/or alkaline bias of the solution in part disintegrates the structure of the matrix reducing it to that colloidal form which has been referred to as being of especial value to plant growth.

It is believed that the areas of the cellular surfaces on which the microscopic salts crystals deposit are enormously extended by being microscopically roughened through the separation therefrom of the colloidal particles, and that the aggregation of these particles in the cell spaces defines inter-particle interstices, providing further lodgment places for the crystals, so that the microscopic voids in the matrix substance are substantially filled by the salts crystals.

In this manner, the hygroscopicity of the composition is minimized, ensuring a free running drillable fertilizer.

The colloidal nature of a part at least of the texture of the matrix material and the fact that both the inter-cellular interstices and the inter-colloidal particle spaces are filled with the crystalline nutrient salts, gives the granules of the fertilizer a relatively smooth surface which causes it to assume a broad angle of repose, this angle being uniform despite considerable variations in the humidity of the atmosphere. This substantially uniform free running capacity of the fertilizer especialy adapts it for distribution by the drill.

The dense distribution through the mass of spongy material, of the crystalline content renders the fertilizer fire-retardant so that while it may burn when subjected to the direct exposure to a flame, it will refuse to support combustion when the flame is withdrawn.

Where the cellular matrix is organic in character, the question of inflammability enters in. According to the present invention, the dense impregnation of the cellular texture of the matrix with the crystalline salts renders it fire-resistant and therefore, practically non-susceptible to spontaneous combustion. Also, the product will not support ordinary combustion even when it contains fairly large amounts of nitrate of soda in addition to other nutrient salts.

In determining the quantities of salt forming chemicals which should be added to obtain a certain analysis, account must be taken of the salts inherently contained in the matrix substance. The tobacco stems will contain from three to eight percent potash, one to three percent ammonia, and less than one percent available phosphoric acid.

In addition to the production of a solely homogeneous fertilizer composed of cellular matrix substance in combination with the locally developed nutrient salts, the invention also contemplates the manufacture of a fertilizer including the homogeneous cellular-salts composition as one of its constituents, dry or wet mixed with any additional desired ingredients. This gives opportunity for the inclusion in the formular of the fertilizer, of desired proportions of the less common plant nutrient or growth promoting substances, such for example as calcium sulphate and compounds of manganese and magnesium.

While the fertilizer made according to the principles of the present invention is characterized as a neutral, slightly acid or slightly alkaline reactive granular or flaky body of cellular or spongy texture, the granules or flakes of which are loaded or impregnated with crystalline plant nutrient salts, and colloidal portions of the cellular substance itself, there is nothing in the spirit or scope of the invention to limit it to use unmixed with other ingredients or fertilizers.

On the contrary, it may for special purposes be dry mixed with other fertilizers or fertilizer ingredients. A particularly advantageous mixture of this nature is made with kaolin or bentonite, which earths have a growth promoting effect on plants, the cause of which has not been finally established but is supposed to be due to the property which these earths possess of absorbing toxic matters detrimental to root life.

While I have in the above description disclosed what I believe to be a practical embodiment of the invention and a practical process for producing the novel product, it is to be understood that the invention is not limited to the particular product specifically described nor to any particular order in the sequence of carrying out the process steps.

What I claim is:

1. Process for manufacturing homogeneous cellular fertilizer comprising treating tobacco stems impregnated with acid or basic constituent of plant nutrient salts and treating the thus impregnated tobacco stems with complementary plant nutrient salts-forming substances so as to form plant nutrient salts in situ in the cellular interstices of said stems, whereby through the mechanical and chemical action of the salts-forming reaction, a part at least of the tobacco stems is disintegrated into a colloidal state.

2. Process for manufacturing homogeneous cellular fertilizer, comprising treating lime-impregnated tobacco stems with phosphoric acid to form plant nutrient salts in situ in the cellular interstices of said stems, whereby through the mechanical and chemical action of the salts-forming reaction a part at least of the tobacco stems is disintegrated into colloidal state.

3. Fertilizer comprising tobacco stems in part retaining their structure of growth and in part disintegrated toward the state of humus, including plant nutrient salts formed in situ and retained in the cellular interstices of said stems and in the inter-colloidal particle spaces.

4. Fertilizer comprising tobacco stems impregnated with lime in sufficient quantity to react with any determined quantity of acid to form in situ in said stems enough plant-nutrient salts to satisfy the requirements of the richest analysis of present commercial fertilizers, without the salts being in free mixture.

FREDERICK WILLIAM GENZ.